US012315993B2

(12) United States Patent
Sato et al.

(10) Patent No.: US 12,315,993 B2
(45) Date of Patent: May 27, 2025

(54) COMMUNICATION DEVICE INCLUDING A PRESSING MEMBER IN CONTACT WITH A COVER MEMBER AND A DIELECTRIC SUBSTRATE

(71) Applicant: Murata Manufacturing Co., Ltd., Nagaokakyo (JP)

(72) Inventors: Kazushige Sato, Nagaokakyo (JP); Kengo Onaka, Nagaokakyo (JP); Hirotsugu Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 216 days.

(21) Appl. No.: 18/099,973

(22) Filed: Jan. 23, 2023

(65) Prior Publication Data

US 2023/0163454 A1 May 25, 2023

Related U.S. Application Data

(63) Continuation of application No. PCT/JP2021/017898, filed on May 11, 2021.

(30) Foreign Application Priority Data

Aug. 13, 2020 (JP) ................................ 2020-136777

(51) Int. Cl.
*H01Q 1/40* (2006.01)
*H01Q 5/10* (2015.01)
(Continued)

(52) U.S. Cl.
CPC ................ *H01Q 1/40* (2013.01); *H01Q 5/10* (2015.01); *H01Q 9/0407* (2013.01); *H01Q 21/08* (2013.01)

(58) Field of Classification Search
CPC ........ G04B 43/00; G04G 17/00; G04R 60/10; H01Q 1/2283; H01Q 1/40; H01Q 1/421;
(Continued)

(56) References Cited

U.S. PATENT DOCUMENTS 8,098,204 B2 * 1/2012 Tsujimura ............... G06F 1/165 343/702
11,121,447 B2 * 9/2021 Wu .......................... H01Q 3/34
(Continued)

FOREIGN PATENT DOCUMENTS

CN 101752651 A 6/2010
EP 0795925 A2 * 9/1997
(Continued)

OTHER PUBLICATIONS

International Search Report and Written Opinion mailed on Aug. 10, 2021, received for PCT Application PCT/JP2021/017898, filed on May 11, 2021, 9 pages including English Translation.
(Continued)

*Primary Examiner* — Raymond R Chai
(74) *Attorney, Agent, or Firm* — XSENSUS LLP

(57) ABSTRACT

A communication device includes a dielectric substrate, a radiating element that has a flat shape and that is formed on the dielectric substrate, a housing that covers the dielectric substrate, and a rib. The rib is disposed in contact with the housing and the dielectric substrate. Feed points to which a radio frequency signal from an RFIC is supplied are formed in the radiating element. The rib and the dielectric substrate are in contact with each other in a center side region of the radiating element relative to the feed points, in a plan view from a normal direction of the dielectric substrate.

20 Claims, 8 Drawing Sheets

(51) Int. Cl.
*H01Q 9/04* (2006.01)
*H01Q 21/08* (2006.01)

(58) Field of Classification Search
CPC ........ H01Q 5/10; H01Q 5/307; H01Q 9/0407; H01Q 21/065; H01Q 21/08
See application file for complete search history.

(56) References Cited

U.S. PATENT DOCUMENTS

| | | | | |
|---|---|---|---|---|
| 11,177,566 | B2 * | 11/2021 | Wu | H01Q 1/38 |
| 2018/0131090 | A1 * | 5/2018 | Ohno | G01S 13/04 |
| 2019/0097301 | A1 * | 3/2019 | Wu | H01Q 19/062 |
| 2020/0227821 | A1 * | 7/2020 | Wu | H01Q 1/38 |
| 2021/0036730 | A1 * | 2/2021 | Bickley | H04B 1/3888 |
| 2021/0111478 | A1 * | 4/2021 | Kim | H01Q 19/24 |

FOREIGN PATENT DOCUMENTS

| | | | |
|---|---|---|---|
| JP | 2000-114857 | A | 4/2000 |
| JP | 2000196310 | A | 7/2000 |
| JP | 2001-156513 | A | 6/2001 |
| JP | 2006094288 | A | 4/2006 |
| JP | 2010028459 | A | 2/2010 |
| JP | 2017-40497 | A | 2/2017 |
| JP | 2017-184150 | A | 10/2017 |
| TW | 201119130 | A | 6/2011 |
| WO | 2019082743 | A1 | 5/2019 |

OTHER PUBLICATIONS

Office Action issued Mar. 25, 2025 in corresponding Chinese Patent Application No. 202180055733.3.

* cited by examiner

COMMUNICATION DEVICE INCLUDING A PRESSING MEMBER IN CONTACT WITH A COVER MEMBER AND A DIELECTRIC SUBSTRATE

CROSS-REFERENCE TO RELATED APPLICATIONS

The present application is a continuation application of International Patent Application No. PCT/JP2021/017898, filed May 11, 2021, which claims priority to Japanese Patent Application No. 2020-136777, filed Aug. 13, 2020, the entire contents of each of which being incorporated herein by reference.

TECHNICAL FIELD

The present disclosure relates to a communication device, and more particularly, to a technique for stabilizing antenna characteristics in a communication device including a patch antenna.

BACKGROUND ART

Japanese Unexamined Patent Application Publication No. 2017-40497 (Patent Document 1) discloses an impact-resistant structure for protecting a patch antenna disposed inside an electronic apparatus such as a satellite radio-controlled clock from an impact caused by dropping or the like. In Japanese Unexamined Patent Application Publication No. 2017-40497 (Patent Document 1), between a patch antenna and a holding member, a gap is formed in which relief portions are formed at a side corner portion and an end corner portion of the patch antenna. When an impact is applied to the electronic apparatus and the patch antenna is caused to relatively move inside the electronic apparatus, the relief portion avoids collision of the holding member with the side corner portion and the end corner portion of the patch antenna. Further, by providing a gently protruding shape to a surface portion of the holding member, a collision area is increased when the surface portion of the holding member collides with a planar region of the patch antenna. This makes it possible to distribute the stress applied to the patch antenna. With the configurations above, the patch antenna may be prevented from being damaged.

CITATION LIST

Patent Document

Patent Document 1: Japanese Unexamined Patent Application Publication No. 2017-40497

SUMMARY

Technical Problems

In an electronic apparatus having a communication function, a cover member that covers an antenna module is provided in many cases. Such a cover member corresponds to an impact-resistant holding member as disclosed in Japanese Unexamined Patent Application Publication No. 2017-40497 (Patent Document 1), a housing of an electronic apparatus main body, or the like.

In a case that a wide space is formed between a radiation surface of a radiating element in an antenna module and a cover member, when the cover member is deformed, a dielectric constant in a radiation direction of a radio wave changes, and thus, an antenna frequency changes. Among other things, this raises a possibility that desired antenna characteristics cannot be achieved.

Accordingly, it is desirable to dispose a member between the cover member and the radiating element so that a gap between the cover member and the radiating element is constant. However, when a member is disposed to widely cover a radiating element, to the contrary, there is a possibility that the antenna characteristics deteriorate because of an antenna frequency change or impact resistance deteriorates.

The present disclosure has been made to solve such a problem, as well as other problems, and an aspect of the disclosure is to make a separation between a cover member and a radiating element constant while suppressing deterioration of antenna characteristics in a communication device.

Solutions to Problems

Among other things, the present disclosure describes a communication device that includes a dielectric substrate, a radiating element that has a flat shape and that is disposed on the dielectric substrate, a cover member that covers the dielectric substrate, and a pressing member. The pressing member is disposed in contact with the cover member and the dielectric substrate and projects from an inner surface of the cover member toward the first radiating element. A feed point, to which a radio frequency signal is supplied from a feed circuit, is formed on the radiating element. In a plan view from a normal direction of the dielectric substrate, the pressing member and the dielectric substrate are in contact with each other in a center surface portion relative to the feed point of the radiating element.

Advantageous Effects

With the use of the communication device according to the present disclosure, a pressing member and a dielectric substrate disposed between a cover member and a radiating element are in contact with each other in a center side region relative to a feed point of the radiating element. Since electric field strength at a center portion of a radiating element is weaker than that at a peripheral portion, when a pressing member is in contact with the center portion, an influence on impedance of a radiating element is small. Accordingly, it is possible to make a distance between a cover member and a radiating element constant while suppressing the deterioration of antenna characteristics.

DESCRIPTION OF EMBODIMENTS

Figure 1:
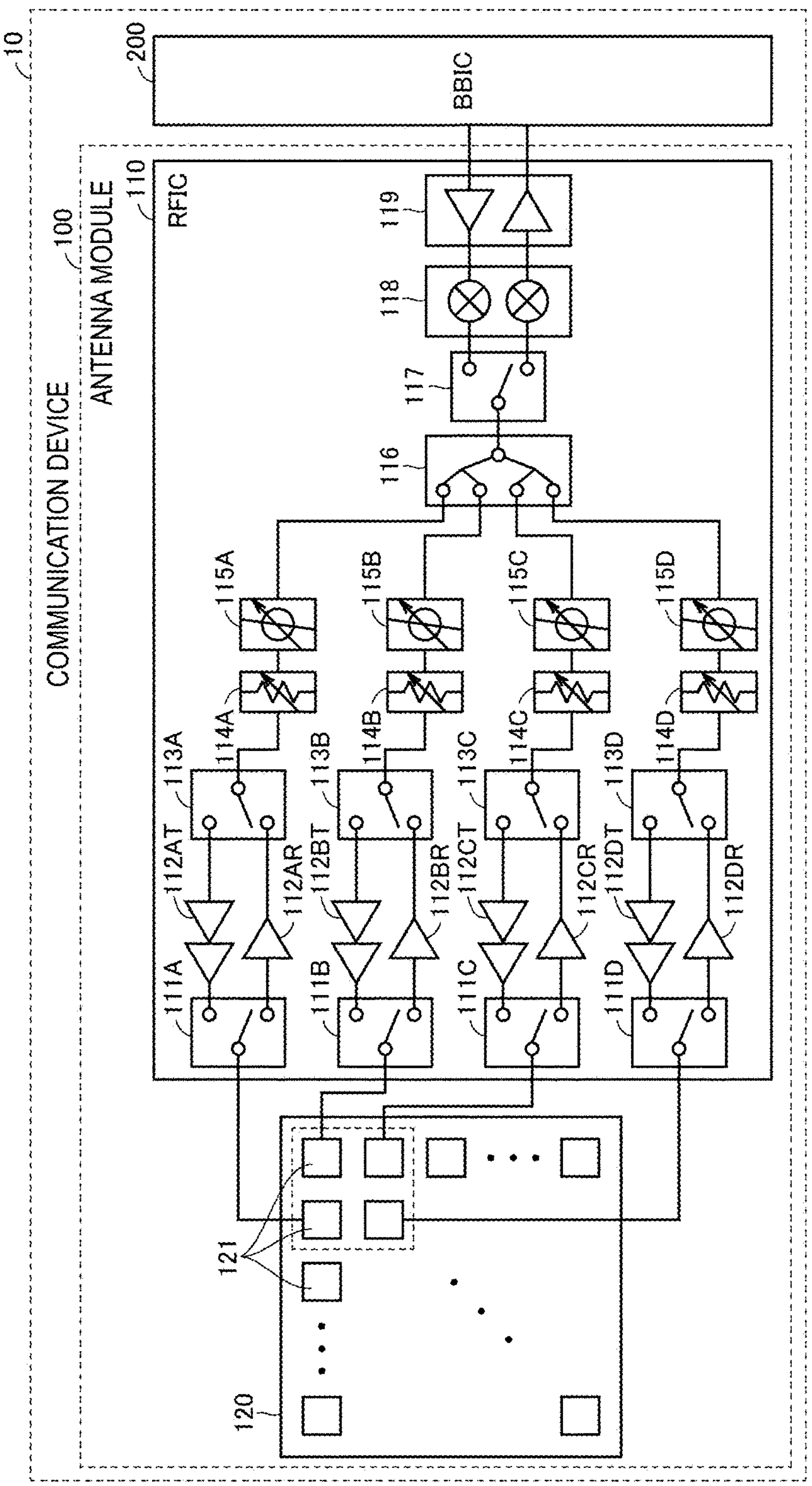
FIG. 1 is a block diagram of a communication device according to an Embodiment.

Hereinafter, an embodiment of the present disclosure will be described in detail with reference to the drawings. Note that the same or corresponding portions in the drawings are denoted by the same reference signs, and a description thereof will not be repeated.

[Basic Configuration of Communication Device]

FIG. 1 is an example of a block diagram of a communication device 10 according to the present embodiment. The communication device 10 is a mobile terminal such as a mobile phone, a smartphone, or a tablet; a personal computer having a communication function; a base station; or the like, for example. An example of a frequency band of a radio wave used in an antenna module 100 according to the present embodiment is a radio wave in a millimeter wave band whose center frequency is 28 GHz, 39 GHz, 60 GHz, or the like, for example. However, a radio wave in a frequency band other than the above may be adopted.

Referring to FIG. 1, the communication device 10 includes the antenna module 100 and a BBIC 200 constituting a baseband signal processing circuit. The antenna module 100 includes an RFIC 110 being an example of a feed circuit and an antenna unit 120. The communication device 10 up-converts a signal, which is transferred from the BBIC 200 to the antenna module 100, into a radio frequency signal and radiates the radio frequency signal from the antenna unit 120; and down-converts a radio frequency signal received by the antenna unit 120 and processes the down-converted signal in the BBIC 200.

In FIG. 1, for facilitating the explanation, only a configuration corresponding to four radiating elements 121 among the multiple radiating elements 121 constituting the antenna unit 120 is illustrated, and a configuration corresponding to other radiating elements 121 having the same configuration is omitted. Although FIG. 1 illustrates an example in which the antenna unit 120 is formed by the multiple radiating elements 121 arranged in a two-dimensional array, the number of radiating elements 121 is not necessarily plural, and the antenna unit 120 may be formed by one radiating element 121. Alternatively, a one-dimensional array in which the multiple radiating elements 121 are arranged in a line may be used. In the present embodiment, the radiating element 121 is described taking a patch antenna having a substantially square flat shape as an example, but the shape of the radiating element 121 may be a circle, an ellipse, or other polygons such as a hexagon.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal combiner/divider 116, a mixer 118, and an amplifier 119.

When a radio frequency signal is transmitted, the switches 111A to 111D and 113A to 113D are changed over to the power amplifiers 112AT to 112DT side, and the switch 117 is connected to a transmission side amplifier of the amplifier 119. When a radio frequency signal is received, the switches 111A to 111D and 113A to 113D are changed over to the low-noise amplifiers 112AR to 112DR side, and the switch 117 is connected to a reception side amplifier of the amplifier 119.

A signal transferred from the BBIC 200 is amplified by the amplifier 119 and up-converted by the mixer 118. A transmission signal, which is an up-converted radio frequency signal, is divided into four signals by the signal combiner/divider 116, then the four signals pass through four signal paths, and are respectively fed to the radiating elements 121 different from each other. At this time, the directivity of the antenna unit 120 may be adjusted by individually adjusting a phase shift degree in each of the phase shifters 115A to 115D disposed in the respective signal paths. Further, the attenuators 114A to 114D adjust the intensity of a transmission signal.

Reception signals, which are radio frequency signals received by the radiating elements 121, respectively pass through four different signal paths, and are combined by the signal combiner/divider 116. The combined reception signal is down-converted by the mixer 118, amplified by the amplifier 119, and transferred to the BBIC 200.

The RFIC 110 is formed as a single-chip integrated circuit component including the above-described circuit configuration, for example. Alternatively, devices (switch, power amplifier, low-noise amplifier, attenuator, and phase shifter) corresponding to each radiating element 121 in the RFIC 110 may be formed as a single-chip integrated circuit component for each corresponding radiating element 121.

[Configuration of Antenna Module]

Figure 2:
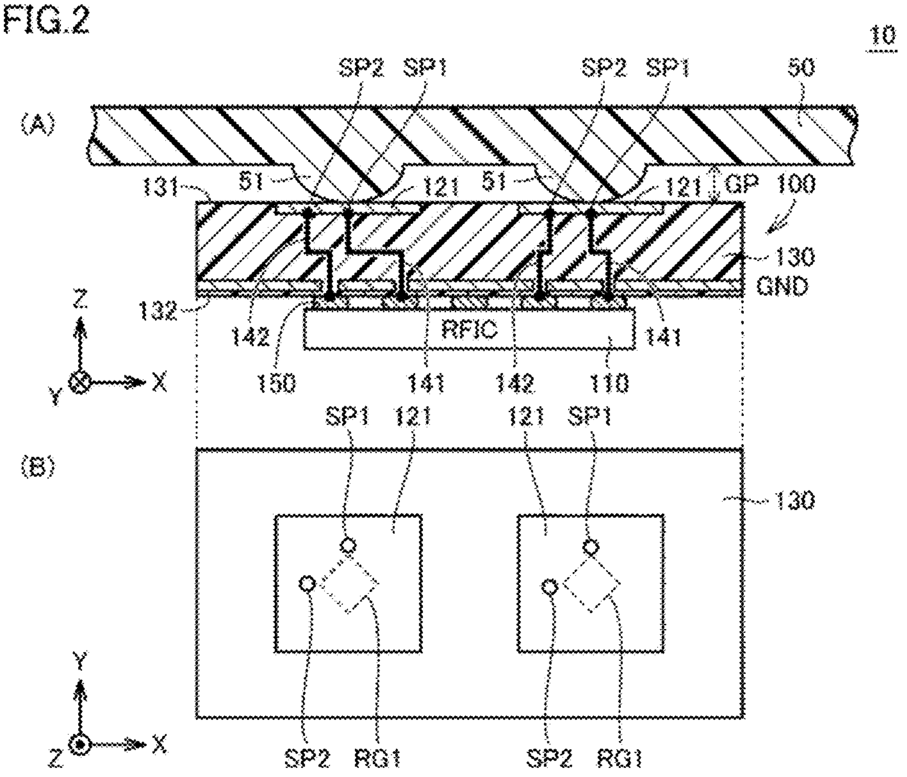
FIG. 2 is a sectional view and a plan view of an antenna module in the communication device of FIG. 1.

FIG. 2 includes a sectional view (FIG. 2(A)) and a plan view (FIG. 2(B)) of the antenna module 100 in the communication device 10 of FIG. 1. Referring to FIG. 2, in the communication device 10, the antenna module 100 is accommodated in a housing 50.

The antenna module 100 includes a dielectric substrate 130, a ground electrode GND, and feed wirings 141 and 142, in addition to the radiating element 121 and the RFIC 110. Note that FIG. 2 illustrates an example of a configuration in which the antenna module 100 includes two radiating elements 121, but the number of radiating elements 121 may be one or three or more. Further, the number of feed points of the radiating element 121 may be one, and in that case, the number of feed wirings is also one. In the following description, a thickness direction of the antenna module 100 is defined as a Z-axis direction, and a plane perpendicular to the Z-axis direction is defined as an X-axis and a Y-axis. Further, in each drawing, a positive direction of the Z-axis is referred to as an upper surface side, and a negative direction thereof is referred to as a lower surface side in some cases.

The dielectric substrate 130 is, for example, a low temperature co-fired ceramics (LTCC) multilayer substrate, a multilayer resin substrate formed by laminating multiple resin layers configured of resin such as epoxy or polyimide, a multilayer resin substrate formed by laminating multiple resin layers configured of liquid crystal polymer (LCP)

having a lower dielectric constant, a multilayer resin substrate formed by laminating multiple resin layers configured of fluororesin, a multilayer resin substrate formed by laminating multiple resin layers configured of a polyethylene terephthalate (PET) material, or a ceramics multilayer substrate other than LTCC. Note that the dielectric substrate 130 does not necessarily have a multilayer structure, and may be a single-layer substrate.

The dielectric substrate 130 has a substantially rectangular shape in a plan view from a normal direction (Z-axis direction), and the radiating element 121 is disposed on an upper surface 131 (surface in the positive direction of the Z-axis) thereof. In FIG. 2, the two radiating elements 121 are adjacently arranged along the X-axis. Further, the ground electrode GND is disposed on a layer of a lower surface 132 side of the dielectric substrate 130 so as to face the radiating element 121. The radiating element 121 may have an aspect to be exposed on the upper surface 131 of the dielectric substrate 130 as in the example of FIG. 2, or may be disposed on an inner layer of the dielectric substrate 130 near the upper surface 131.

The RFIC 110 is mounted on the lower surface 132 of the dielectric substrate 130 via solder bumps 150. Note that the RFIC 110 may be connected to the dielectric substrate 130 using a multi-pole connector instead of a solder connection.

A radio frequency signal is transferred from the RFIC 110 to each of the radiating elements 121 via the feed wirings 141 and 142. The feed wiring 141 penetrates through the ground electrode GND from the RFIC 110, and is connected to a feed point SP1 from a lower surface side of the radiating element 121. Further, the feed wiring 142 penetrates through the ground electrode GND from the RFIC 110, and is connected to a feed point SP2 from the lower surface side of the radiating element 121.

In each of the radiating elements 121, the feed point SP1 is formed at a position offset from a center of the radiating element 121 in a positive direction of the Y-axis. When a radio frequency signal is supplied to the feed point SP1, a radio wave having a polarization direction in the Y-axis direction is radiated from the radiating element 121. Further, the feed point SP2 is formed at a position offset from the center of the radiating element 121 in a negative direction of the X-axis. When a radio frequency signal is supplied to the feed point SP2, a radio wave having a polarization direction in the X-axis direction is radiated from the radiating element 121. That is, the antenna module 100 is a dual-polarization type antenna module capable of radiating radio waves in two different polarization directions.

The antenna module 100 is disposed inside the housing 50 such that a distance GP between the dielectric substrate 130 and the housing 50 is a predetermined distance. A pressing member (e.g., rib, protrusion, bump, or ridge) 51 that protrudes from an inner surface of the housing (e.g., cover) 50 is formed in the housing 50. A tip portion of the rib 51 is formed in a conical shape or a spherical shape. The tip of the rib 51 is in contact with the dielectric substrate 130 in a region RG1 near the center of the radiating element 121 in a plan view from a normal direction of the dielectric substrate 130. The region RG1 is a region near the center of the radiating element 121 relative to the feed points SP1 and SP2, and is indicated by a broken line portion in a plan view of FIG. 2(B). Note that as illustrated in FIG. 2(B), the region RG1 may be a region inside a quadrangle whose apexes are the feed points SP1 and SP2, or may be a region inside a circle whose radius is a distance from the center of the radiating element 121 to the feed point. Further, a contact region between the rib 51 and the dielectric substrate 130 may slightly swell out from the region RG1.

The housing 50 of the communication device 10 may more or less be deformed by force applied from an outside. When the housing 50 deforms, the distance GP between the housing 50 and the dielectric substrate 130 varies, and a dielectric constant in a radiation direction of a radio wave may vary. A resonant frequency of the radiating element varies due to a variation in the dielectric constant, and there may arise a case that desired antenna characteristics cannot be realized.

In the communication device 10 with the configuration of the present embodiment, since the rib 51 formed on the housing 50 can suppress a variation in the distance GP between the dielectric substrate 130 and the housing 50, the deterioration of antenna characteristics may be prevented. Further, since the radiating element 121 is pressed by the rib 51, the separation of the radiating element 121 from the dielectric substrate 130 may also be suppressed.

Figure 3:
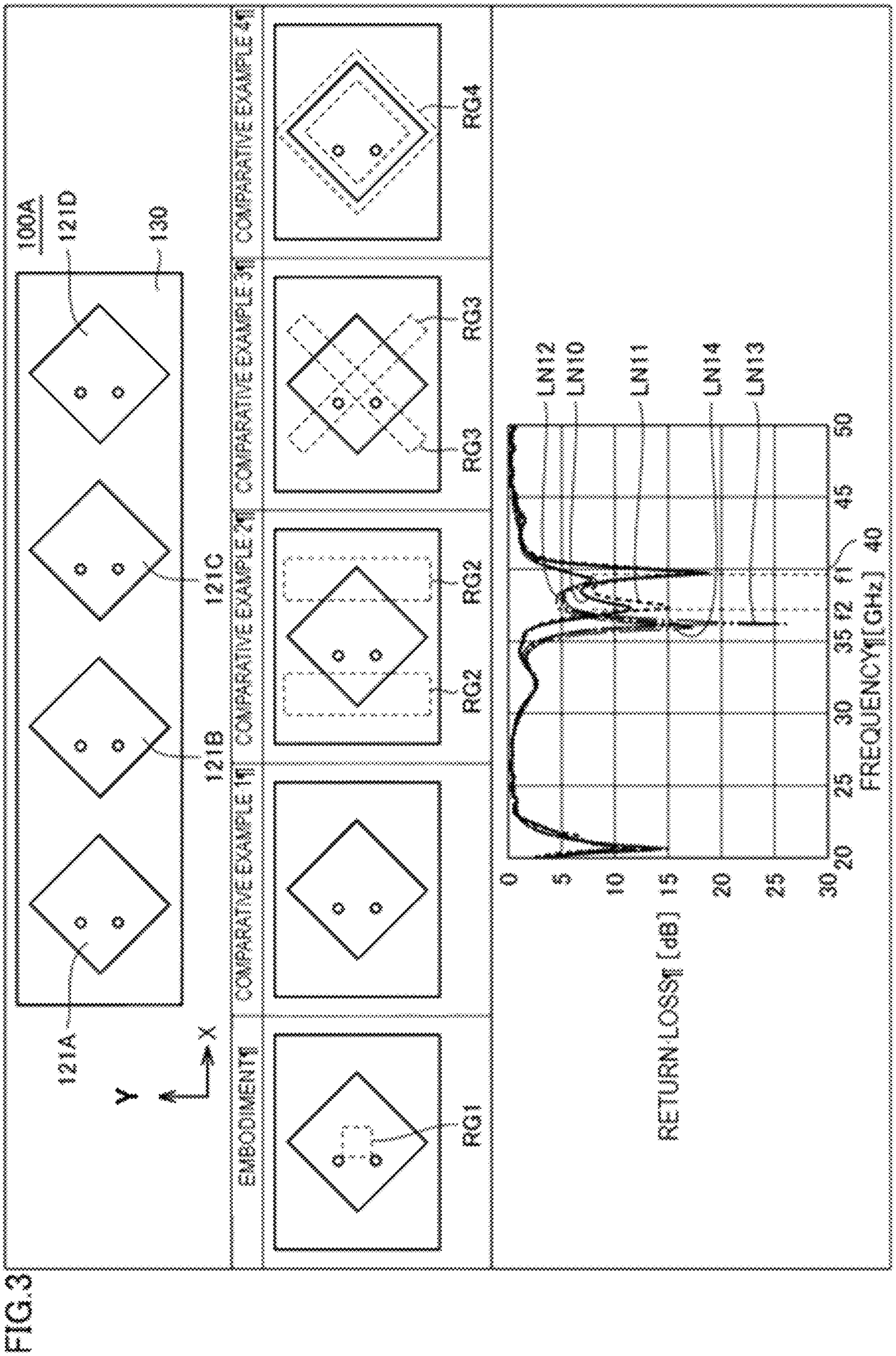
FIG. 3 is a diagram and a graph for explaining an influence of rib disposition on a return loss.

FIG. 3 is a diagram and a graph for explaining an influence of the disposition of the rib 51 on a return loss of an antenna module. In FIG. 3, with respect to an antenna module 100A of a one-dimensional array in which four radiating elements 121A to 121D are arranged in a line (upper column), compared are the return losses due to the presence or absence of the rib 51 and due to a difference in a pressing position of the rib 51 (lower column). In the antenna module 100A, the sides of the substantially square radiating element 121 are disposed to be inclined by 45° relative to the X-axis and the Y-axis, and the two polarization directions are also inclined by 45° relative to the X-axis and the Y-axis. Note that, FIG. 3 illustrates an example of a simulation result in a case that a target frequency band is a 39 GHz band.

In the middle column of FIG. 3, variations (comparative examples) of the pressing position of the rib 51 are illustrated. Comparative Example 1 is an example of a case that no rib 51 is disposed. Comparative Example 2 is an example of a case that the ribs 51 are disposed so that the radiating element 121 is pressed in regions RG2 along the Y-axis. Comparative Example 3 is an example of a case that the ribs 51 are disposed so that the radiating element 121 is pressed in cross-shaped regions RG3 passing through the center of the radiating element 121. Comparative Example 4 is an example of a case that the rib 51 is disposed so that a region RG4 being an outer peripheral edge of the radiating element 121 is pressed.

In the graph illustrating the return loss in the lower column of FIG. 3, the case of the present embodiment is indicated by a solid line LN10, and the case of Comparative Example 1 is indicated by a broken line LN11. Further, Comparative Example 2 to Comparative Example 4 are respectively indicated by a dash-dotted line LN12, an alternate long and two short dashes line LN13, and a dash-dotted line LN14. Note that in FIG. 3, variations of the frequency exhibiting a return loss minimum value, in the present embodiment and other Comparative Example 2 to Comparative Example 4, are compared with that in Comparative Example 1 in which no rib is provided as a reference.

Referring to FIG. 3, the return loss minimum values occur at resonant frequencies f1 and f2 in the case of Comparative Example 1 in which no rib is disposed, and the return loss minimum values occur at substantially the same frequencies also in the case of the present embodiment. On the other hand, in the cases of Comparative Example 2 to Comparative Example 4, the minimum values corresponding to the resonant frequencies f1 and f2 are both shifted to a lower frequency side. This means that impedance varies under the influence of the electric field strength of the radiating element 121, and as a result, the resonant frequency shifts.

As in the present embodiment, by bringing the rib 51 and the radiating element 121 into contact with each other avoiding the end portion of the radiating element 121 where the electric field strength becomes large, the influence of the rib 51 on the antenna characteristics may be minimized.

Next, with reference to FIG. 4 and FIG. 5, in the communication device including the antenna module 100A having the four radiating elements 121A to 121D illustrated in FIG. 3, the influence on the directivity when the number of ribs 51 pressing the radiating elements 121 is changed will be described.

FIG. 4(A) is a sectional view of a communication device 10X being a comparative example in which no rib 51 is formed. FIG. 4(B) is a sectional view of a communication device 10A in which the ribs 51 are formed so as to press the radiating elements 121A and 121D at both ends. Further, FIG. 4(C) is a sectional view of a communication device 10B in which the ribs 51 are formed so as to press all of the four radiating elements 121A to 121D.

Figure 5:
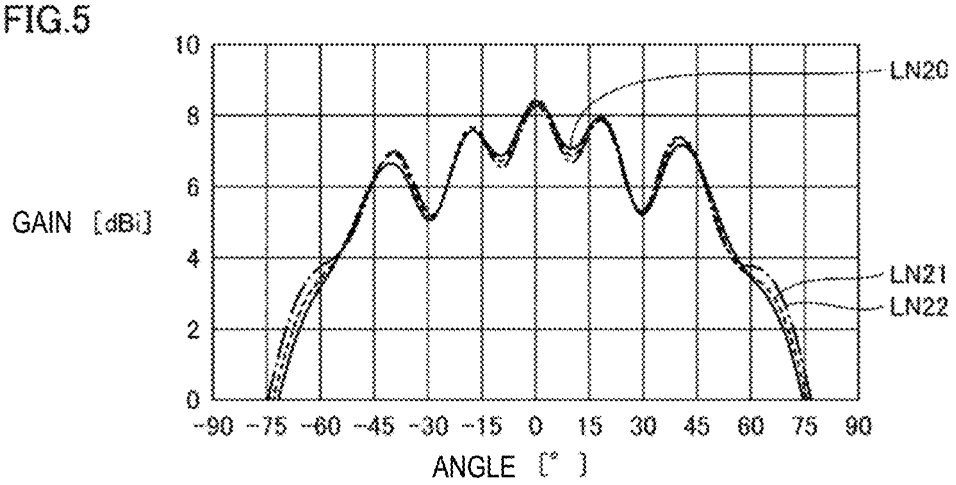
FIG. 5 is a graph for explaining a gain in the example of FIG. 4.

FIG. 5 is a graph illustrating a peak gain in a case that the normal direction (Z-axis direction, that is, 0° direction) of the radiating element 121 is the radiation direction. The horizontal axis of FIG. 5 represents an angle from the Z-axis direction to the X-axis direction, and the vertical axis represents the peak gain. In FIG. 5, a peak gain of the communication device 10B is illustrated by a solid line LN20, a peak gain of the communication device 10A is illustrated by a broken line LN21, and a peak gain of the communication device 10X of the comparative example is illustrated by a dash-dotted line LN22. Note that FIG. 5 is also a simulation result in a case that the target frequency band is the 39 GHz band.

Figure 4:
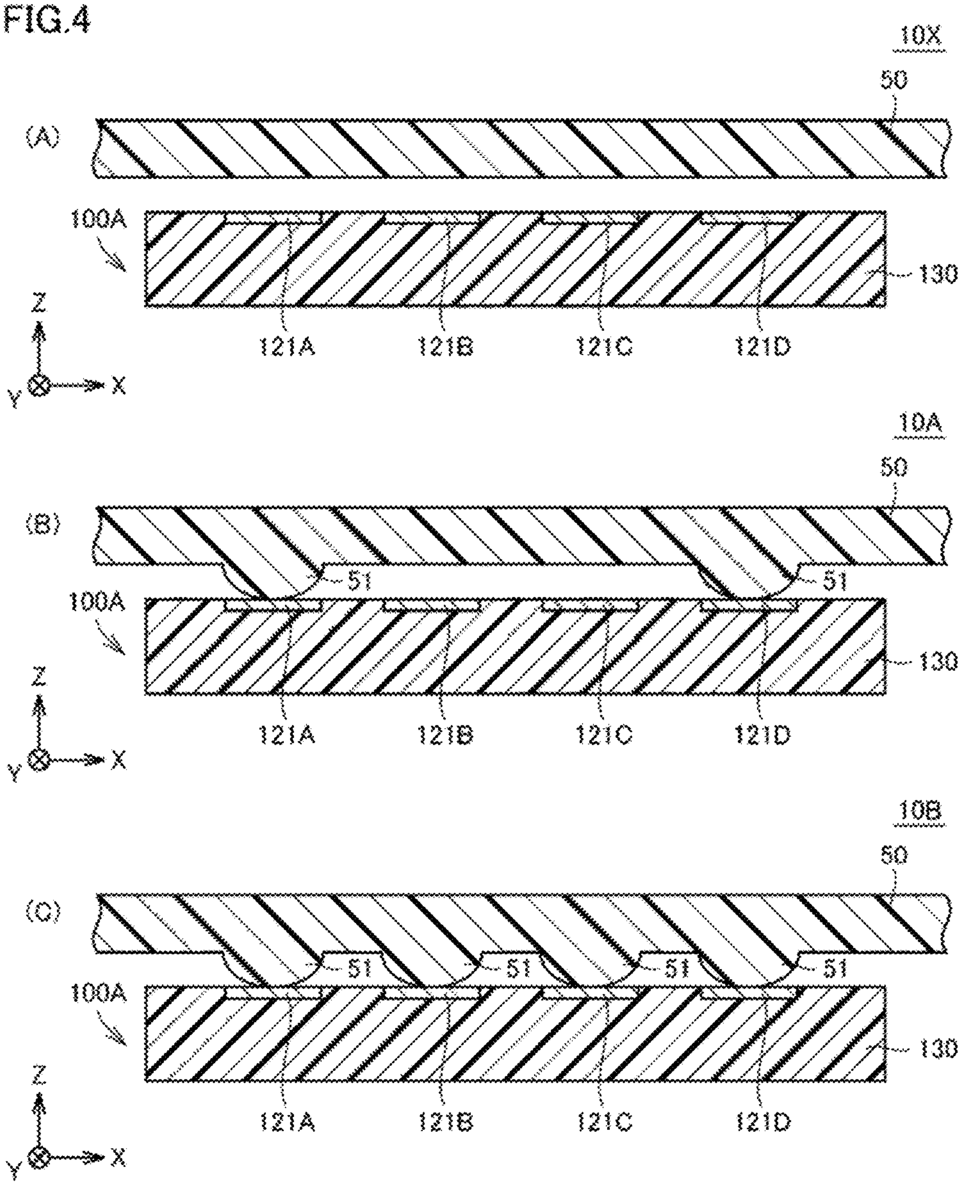
FIG. 4 is a diagram illustrating an example of rib disposition in an array antenna. The diagram includes three subparts (4(*a*), 4(*b*), and 4(*c*)), and therefore sometimes referred to as FIG. 4(*a*), FIG. 4(*b*), and FIG. 4(*c*).

Referring to FIG. 5, in the three communication devices illustrated in FIG. 4, the peak gain in the radiation direction of the communication device 10B (solid line LN20) is the largest. Further, as the angle from the radiation direction increases, the peak gain of the communication device 10B becomes smaller than those of other communication devices. That is, it can be seen that a "lens effect" in which energy is concentrated in the radiation direction is obtained by disposing the ribs 51 corresponding to the respective radiating elements 121.

The communication device 10A (broken line LN21), in which the ribs 51 are formed on the radiating elements 121A and 121D at both ends, has intermediate characteristics between those of the communication device 10B and the communication device 10X of the comparative example. Thus, the lens effect of a gain tends to increase as the number of radiation electrodes increases on which the ribs 51 are disposed.

As described above, in a communication device, by disposing a rib formed on a housing to be in contact with the dielectric substrate at a center portion of a radiating element where electric field strength becomes weak, deformation of the housing may be reduced while an influence on impedance is suppressed. With this, a distance between the housing and the radiating element may be made constant while suppressing the deterioration of antenna characteristics.

Further, in an array antenna in which multiple radiating elements are arranged in an array, gain characteristics may be improved by disposing ribs for more radiating elements.

Note that a configuration has been described above in which ribs are disposed between a housing of a communication device main body and an antenna module. However, in a case that, inside a housing, an antenna module is covered with a case or a protective cover, ribs may be disposed between the case or the cover and the antenna module. The above-described "housing", "case", and "cover" correspond to "cover member" in the present disclosure.

[Modifications]

In the following description, modifications of a shape of a dielectric substrate on which a radiating element is formed and a disposition of a rib will be described.

(Modification 1)

Figure 6:
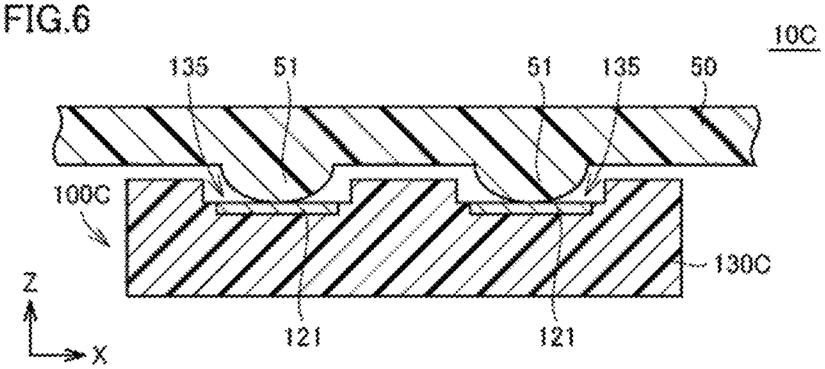
FIG. 6 is a sectional view of a communication device of Modification 1.

FIG. 6 is a sectional view of a communication device 10C of Modification 1. An antenna module 100C illustrated in FIG. 6 has a configuration in which the dielectric substrate 130 in the antenna module 100 described in FIG. 2 is replaced with a dielectric substrate 130C. In FIG. 6 and FIG. 7 to FIG. 15 to be described later, the description of elements overlapping with FIG. 2 will not be repeated. Further, In FIG. 6 to FIG. 15, the RFIC 110, the ground electrode GND, and the feed wirings 141 and 142 are omitted.

Referring to FIG. 6, in the antenna module 100C of Modification 1, a recess 135 is formed at a portion of the dielectric substrate 130C facing the rib 51 of the housing 50, and the radiating element 121 is disposed at a bottom portion of the recess 135. Then, inside the recess 135, the rib 51 formed on the housing 50 is in contact with the radiating element 121. In the same manner as in FIG. 2, the rib 51 is in contact with the radiating element 121 in a center side region (region RG1 in FIG. 2, where the center side region is also referred to as a center surface portion) relative to the feed point of the radiating element 121.

With such a configuration, a portion of the dielectric substrate 130C around the recess 135 may be used as a region for disposing a wiring, a filter, or the like. Thus, the degree of layout freedom in a dielectric substrate may be increased. Further, since the rib 51 of the housing 50 enters the recess 135, positional deviation between the antenna module and the housing 50 may be suppressed.

(Modification 2)

Figure 7:
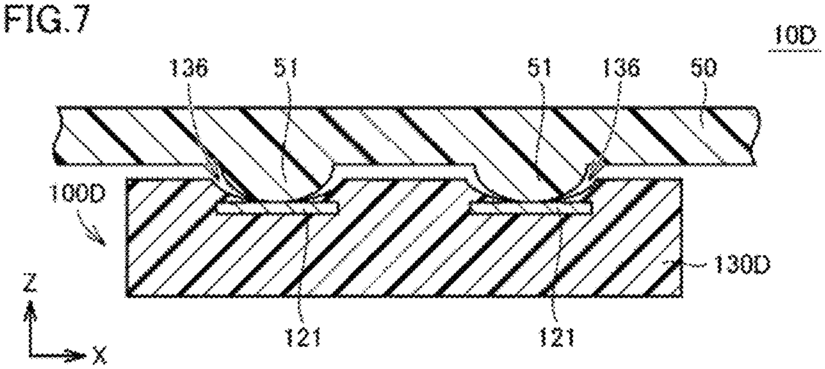
FIG. 7 is a sectional view of a communication device of Modification 2.

FIG. 7 is a sectional view of a communication device 10D of Modification 2. An antenna module 100D illustrated in FIG. 7 has a configuration in which the dielectric substrate 130 in the communication device 10 described in FIG. 2 is replaced with a dielectric substrate 130D.

Referring to FIG. 7, in the antenna module 100D of Modification 2, a recess 136 is formed at a portion of the dielectric substrate 130D facing the rib 51 of the housing 50, and the radiating element 121 is disposed at a bottom portion of the recess 136. With this, in the same manner as in Modification 1, the degree of layout freedom in a dielectric substrate may be increased.

Further, in the recess 136, a surface facing the housing 50 is formed in a spherical shape centered on the center of the radiating element 121, and the radius of curvature of the spherical surface of the recess 136 is larger than the radius of curvature of a tip end of the rib 51. With such a shape, the positioning of the tip end of the rib 51 at a center portion of the recess 136 becomes easier, and the positioning of the rib 51 and the radiating element 121 may further be facilitated.

(Modification 3)

Figure 8:
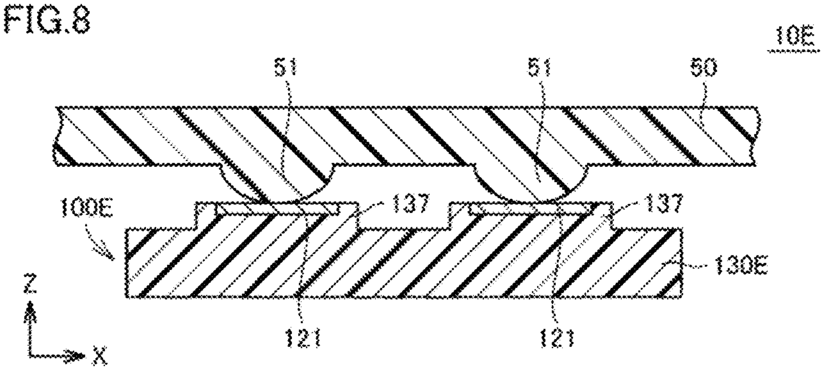
FIG. 8 is a sectional view of a communication device of Modification 3.

FIG. 8 is a sectional view of a communication device 10E of Modification 3. An antenna module 100E illustrated in FIG. 8 has a configuration in which the dielectric substrate 130 in the communication device 10 described in FIG. 2 is replaced with a dielectric substrate 130E.

Referring to FIG. 8, in the antenna module 100E of Modification 3, a protrusion 137 is formed at a portion of the dielectric substrate 130E facing the rib 51 of the housing 50, and the radiating element 121 is disposed on an upper surface of the protrusion 137. Then, the rib 51 formed on the housing 50 is in contact with the radiating element 121 on the protrusion 137.

Although omitted in FIG. 8, the RFIC 110 is mounted in some cases on the dielectric substrate 130E as illustrated in FIG. 2. Since a power amplifier and a low-noise amplifier are included in the RFIC 110, heat may be generated during transmission operation and reception operation of a radio wave. In the communication device 10E of Modification 3, a gap, between the dielectric substrate 130E and the housing 50 at a portion other than the protrusion 137 where the radiating element 121 is disposed, is wider than that of the dielectric substrate 130 of FIG. 2. This makes it possible to enhance a cooling effect of the dielectric substrate 130E.

Further, as compared with the dielectric substrate 130 of FIG. 2, since the amount of the dielectric material in the dielectric substrate is reduced, an effective dielectric constant may be decreased. With this, the frequency band width of a radiated radio wave may be expanded.

(Modification 4)

Figure 9:
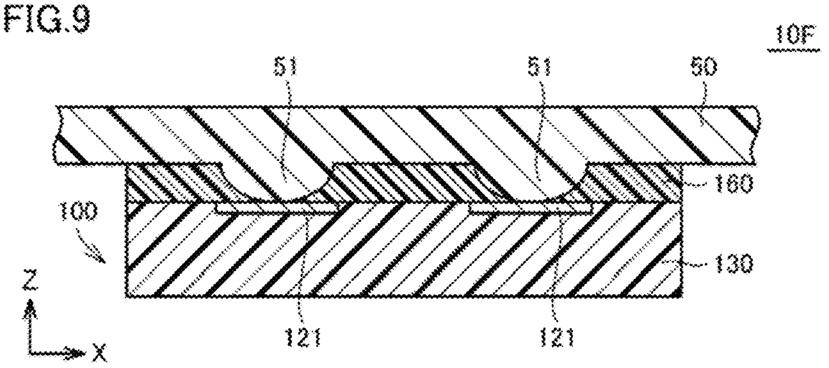
FIG. 9 is a sectional view of a communication device of Modification 4.

FIG. 9 is a sectional view of a communication device 10F of Modification 4. The communication device 10F illustrated in FIG. 9 has a configuration in which a space portion, between the dielectric substrate 130 and the housing 50 of the communication device 10 described in FIG. 2, that is, the periphery of the rib 51, is filled with a resin layer 160. With such a configuration, the variation in the distance between the housing 50 and the dielectric substrate 130 may further be decreased.

Note that, in a case that an end portion of the radiating element 121 is supported by a dielectric, the antenna characteristics are likely to be affected as illustrated in FIG. 3. Thus, the resin layer 160 is preferably made of a material having a dielectric constant lower than the dielectric constant of the rib 51 and the dielectric constant of the dielectric substrate 130.

(Modification 5)

Figure 10:
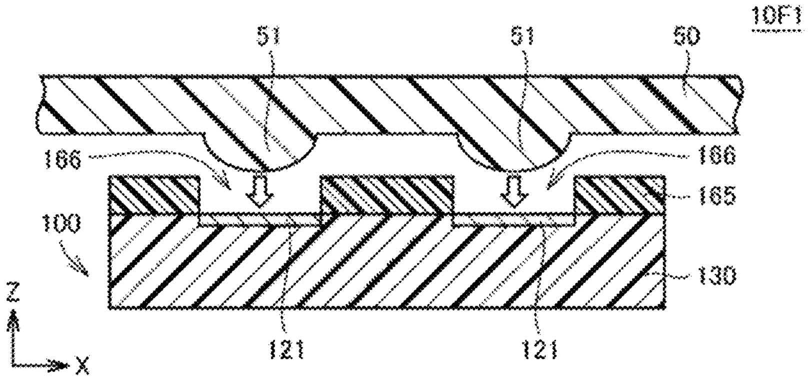
FIG. 10 is a sectional view of a communication device of Modification 5.

FIG. 10 is a sectional view of a communication device 10F1 of Modification 5. The communication device 10F of Modification 4 has a configuration in which the space portion between the dielectric substrate 130 and the housing 50 is filled with the resin layer 160 after the housing 50 is disposed on the dielectric substrate 130. On the other hand, the communication device 10F1 of Modification 5 is provided with an intermediate layer 165 in which an opening 166 is formed at a portion corresponding to the radiating element 121, and the housing 50 is disposed on the dielectric substrate 130 on which the intermediate layer 165 is formed. The intermediate layer 165 is a resist used as a protective film, for example.

The opening 166 of the intermediate layer 165 is formed to have a size corresponding to an outer shape of the rib 51 of the housing 50, and the rib 51 can enter the opening 166. By making the size of the opening 166 to be substantially the same as that of the rib 51, movement of the rib 51 in the opening 166 is suppressed. Accordingly, the positional deviation in an XY plane of the housing 50 disposed on the radiating element 121 may be suppressed.

(Modification 6)

Figure 11:
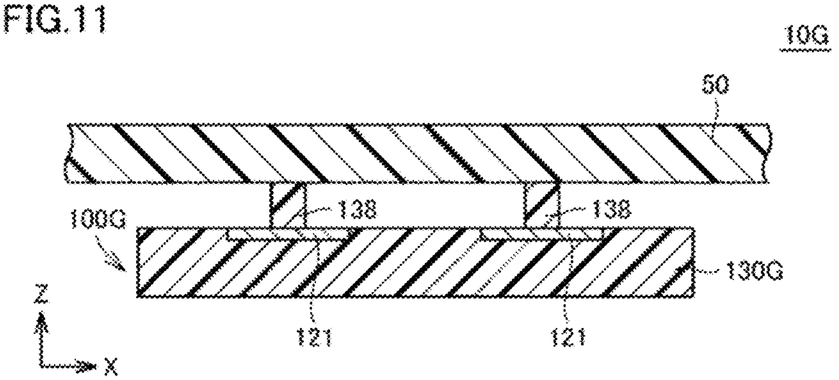
FIG. 11 is a sectional view of a communication device of Modification 6.

FIG. 11 is a sectional view of a communication device 10G of Modification 6. In the communication device 10G illustrated in FIG. 11 has a configuration in which a rib 138 is formed on an antenna module 100G instead of the rib 51 of the housing 50.

The rib 138 is formed in a columnar shape, and is disposed in the center side region relative to the feed point of the radiating element 121 in a plan view from a normal direction of a dielectric substrate 130G. Note that the rib 138 may be formed as part of the dielectric substrate 130G or may be formed by attaching a member, different from the dielectric substrate 130G, to the dielectric substrate 130G.

Thus, even in the configuration in which a rib is formed on a dielectric substrate side, the rib is formed at the center portion of the radiating element where the electric field strength is relatively weak. This makes it possible to make the distance between the housing and the radiating element constant while suppressing the deterioration of antenna characteristics.

(Modification 7 to Modification 9)

With regard to Modification 7 to Modification 9, in an antenna module in which four or more radiating elements are formed, variations of rib disposition will be described in a case that the rib is formed for part of radiating elements.

Figure 12:
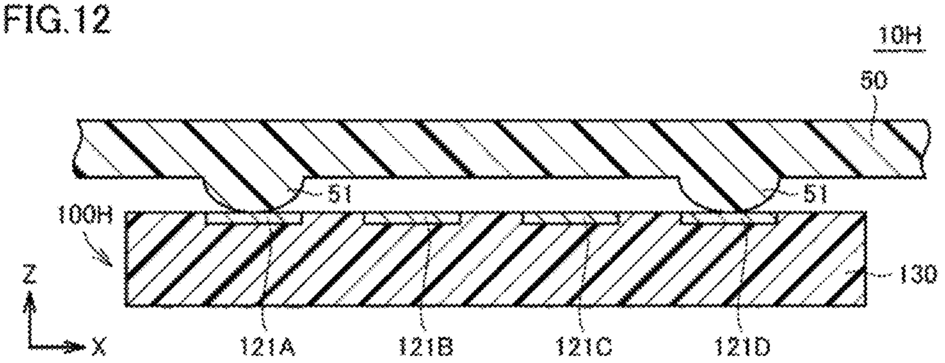
FIG. 12 is a sectional view of a communication device of Modification 7.
Figure 13:
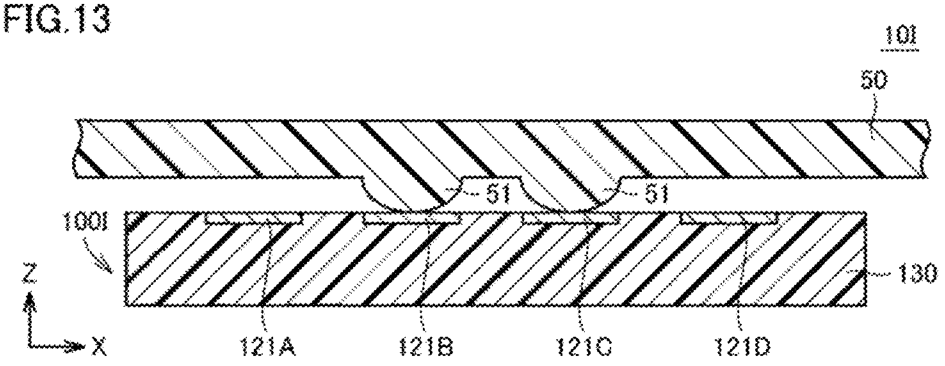
FIG. 13 is a sectional view of a communication device of Modification 8.

FIG. 12 and FIG. 13 are views of a communication device 10H (Modification 7) and a communication device 10I (Modification 8) respectively including antenna modules 100H and 100I in which four radiating elements 121A to 121D are one dimensionally arranged.

In the communication device 10H of FIG. 12, the ribs 51 are formed corresponding to the radiating elements 121A and 121D at both ends, and no ribs 51 are formed for the inner side radiating elements 121B and 121C. On the other hand, in the communication device 10I of FIG. 13, the ribs 51 are formed corresponding to the inner radiating elements 121B and 121C, and no ribs 51 are formed for the radiating elements 121A and 121D at both ends.

When attention is paid to mechanical strength of the housing 50, the communication device 10H supporting the housing 50 at both ends is more preferable than the communication device 10I because the deformation of the housing 50 may be reduced. In the communication device 10I, the deformation of the housing 50 near the radiating elements 121A and 121D at both ends tends to be large.

On the other hand, as described in FIG. 5, forming the ribs 51 increases the peak gain by the lens effect. When attention is paid to the gain characteristics, the lens effect becomes more remarkable when the ribs 51 are formed on the radiating elements 121B and 121C close to a center portion of an array antenna as in the communication device 10I. Accordingly, the peak gain is increased more in the communication device 10I than in the communication device 10H.

Figure 14:
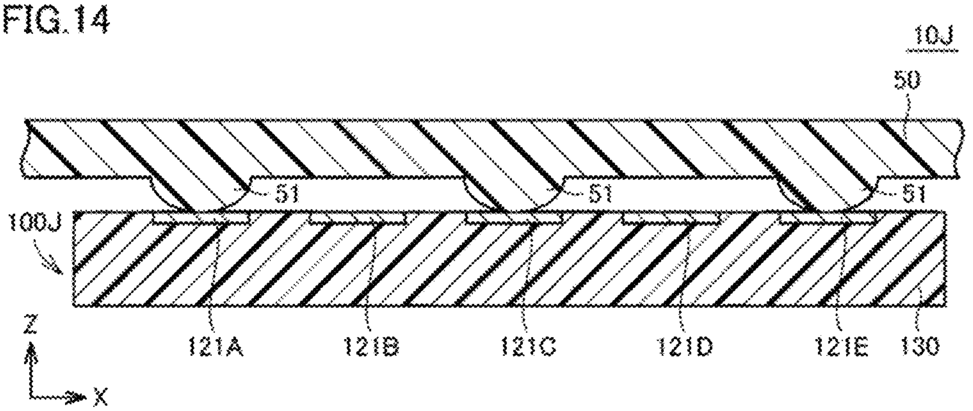
FIG. 14 is a sectional view of a communication device of Modification 9.

FIG. 14 is a diagram of a communication device 10J (Modification 9) including an antenna module 100J in which five radiating elements 121A to 121E are one dimensionally arranged. In the communication device 10J, the ribs 51 are formed corresponding to the radiating elements 121A and 121E at both ends, and the radiating element 121C at the center, and no ribs 51 are formed for the radiating elements 121B and 121D. In other words, the ribs 51 are formed on every other radiating element.

With such a configuration, the gain characteristics near the center may be improved while maintaining the mechanical strength of a housing. Further, since a space between an antenna module and a housing can be ensured, a heat dissipation effect may be expected.

In a case that a greater number of radiating elements are arranged in an antenna module, ribs may be formed on every third radiating element, for example. Note that, in order to ensure the symmetry of radio waves radiated from an entire array antenna, it is preferable to symmetrically dispose ribs with respect to a radiating element.

As described above, in an antenna module in which multiple radiating elements are arranged in an array, the number and formation position of ribs may be determined in consideration of mechanical strength, gain characteristics, heat dissipation characteristics, and the like.

(Modification 10)

Figure 15:
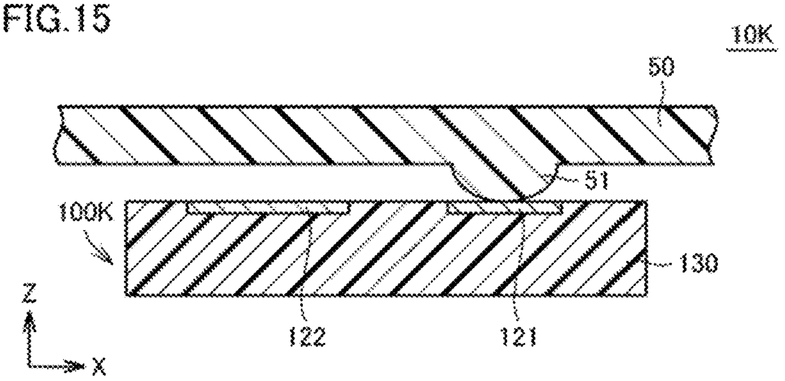
FIG. 15 is a sectional view of a communication device of Modification 10.

FIG. 15 is a sectional view of a communication device 10K of Modification 10. In an antenna module 100K of the communication device 10K illustrated in FIG. 15, radiating elements 121 and 122 of sizes different from each other are arranged adjacent to each other. That is, the antenna module 100K is a dual-band type antenna module capable of radiating radio waves in frequency bands different from each other.

The size of the radiating element 122 is larger than that of the radiating element 121. Accordingly, a frequency band (second frequency band) of a radio wave radiated from the radiating element 122 is lower than a frequency band (first frequency band) of a radio wave radiated from the radiating element 121.

Then, in the communication device 10K, the rib 51 is formed for the radiating element 121 of a higher frequency side, and no rib 51 is formed for the radiating element 122 of a lower frequency side. In general, it is known that the following relational equation (1) is satisfied in the lens effect, when D is a spot diameter before entering a lens, d is a spot diameter after passing through the lens, f is a spot focal distance, and λ is a wavelength of a radio wave.

$$d=4\cdot f\cdot\lambda/(\pi\cdot D) \quad (1)$$

That is, as a wavelength of a radio wave becomes shorter, the spot diameter d after the passing becomes smaller, so that the lens effect becomes remarkable. Accordingly, in a dual-band type antenna module such as the antenna module 100K, when it is necessary to form the ribs 51 thinning out for the heat dissipation characteristics, the ribs 51 are formed for the radiating elements of a relatively higher frequency side. This makes it possible to improve the heat dissipation characteristics while suppressing deterioration of the gain characteristics.

The "radiating element 121" and the "radiating element 122" in the present embodiment respectively correspond to a "first radiating element" and a "second radiating element" in the present disclosure.

It should be understood that the embodiment disclosed herein is illustrative in all respects and is not restrictive. The scope of the present invention is defined not by the above description of the embodiment but by the claims, and is intended to include all modifications within the meaning and scope equivalent to the claims.

REFERENCE SIGNS LIST

10, 10A to 10K, 10F1, 10X COMMUNICATION DEVICE, 50 HOUSING, 51, 138 RIB, 100, 100A, 100C to 100E, 100G to 100K ANTENNA MODULE, 110 RFIC, 111A to 111D, 113A to 113D, 117 SWITCH, 112AR to 112DR LOW-NOISE AMPLIFIER, 112AT to 112DT POWER AMPLIFIER, 114A to 114D ATTENUATOR, 115A to 115D PHASE SHIFTER, 116 SIGNAL COMBINER/DIVIDER, 118 MIXER, 119 AMPLIFIER, 120 ANTENNA UNIT, 121, 121A to 121E, 122 RADIATING ELEMENT, 130, 130C to 130E, 130G DIELECTRIC SUBSTRATE, 135, 136 RECESS, 137 PROTRUSION, 141, 142 FEED WIRING, 150 SOLDER BUMP, 160 RESIN LAYER, 165 INTERMEDIATE LAYER, 166 OPENING, 200 BBIC, GND GROUND ELECTRODE, SP1, SP2 FEED POINT

The invention claimed is:

1. A communication device, comprising:
- a dielectric substrate;
- a first radiating element that has a flat shape and that is disposed on the dielectric substrate;
- a cover member that covers the dielectric substrate; and
- a pressing member disposed in contact with the cover member and the dielectric substrate and protruding from an inner surface of the cover member toward the first radiating element, wherein
- the first radiating element includes a feed point to which a radio frequency signal from a feed circuit is supplied, and
- the pressing member and the dielectric substrate are in contact with each other in a center surface portion of the first radiating element relative to the feed point in a plan view from a normal direction of the dielectric substrate.

2. The communication device according to claim 1, wherein the pressing member is an integral part of the cover member.

3. The communication device according to claim 1, wherein
- a surface of the dielectric substrate includes a recess that faces the cover member, and
- the first radiating element is disposed at a bottom portion of the recess.

4. The communication device according to claim 2, wherein
- a surface of the dielectric substrate includes a recess that faces the cover member, and
- the first radiating element is disposed at a bottom portion of the recess.

5. The communication device according to claim 1, wherein
- a surface of the dielectric substrate includes a protrusion that extends toward the cover member, and
- the first radiating element is disposed on or near an upper surface of the protrusion.

6. The communication device according to claim 1, wherein the pressing member is an integral part of the dielectric substrate.

7. The communication device according to claim 1, further comprising:
- a resin layer filled around the pressing member between the cover member and the dielectric substrate,
- wherein a dielectric constant of the resin layer is lower than a dielectric constant of the dielectric substrate and a dielectric constant of the pressing member.

8. The communication device according to claim 3, further comprising:
- a resin layer filled around the pressing member between the cover member and the dielectric substrate,
- wherein a dielectric constant of the resin layer is lower than a dielectric constant of the dielectric substrate and a dielectric constant of the pressing member.

9. The communication device according to claim 3, further comprising:
- a resin layer filled around the pressing member between the cover member and the dielectric substrate,
- wherein a dielectric constant of the resin layer is lower than a dielectric constant of the dielectric substrate and a dielectric constant of the pressing member.

10. The communication device according to claim 1, further comprising:

a second radiating element that has a flat shape and that is disposed adjacent to the first radiating element on the dielectric substrate, wherein the first radiating element is configured to radiate a radio wave in a first frequency band, the second radiating element is configured to radiate a radio wave in a second frequency band lower than the first frequency band, and the pressing member is positioned to oppose the first radiating element, but not the second radiating element.

11. The communication device according to claim 2, further comprising:

a second radiating element that has a flat shape and that is disposed adjacent to the first radiating element on the dielectric substrate, wherein the first radiating element is configured to radiate a radio wave in a first frequency band, the second radiating element is configured to radiate a radio wave in a second frequency band lower than the first frequency band, and the pressing member is positioned to oppose the first radiating element, but not the second radiating element.

12. The communication device according to claim 7, further comprising:

a second radiating element that has a flat shape and that is disposed adjacent to the first radiating element on the dielectric substrate, wherein the first radiating element is configured to radiate a radio wave in a first frequency band, the second radiating element is configured to radiate a radio wave in a second frequency band lower than the first frequency band, and the pressing member is positioned to oppose the first radiating element, but not the second radiating element.

13. The communication device according to claim 1, wherein the pressing member and the dielectric substrate are in contact with each other only in an overlapping region as viewed from the plan view from the normal direction of the dielectric substrate.

14. The communication device according to claim 2, wherein the pressing member and the dielectric substrate are in contact with each other only in an overlapping region as viewed from the plan view from the normal direction of the dielectric substrate.

15. The communication device according to claim 7, wherein the pressing member and the dielectric substrate are in contact with each other only in an overlapping region as viewed from the plan view from the normal direction of the dielectric substrate.

16. The communication device according to claim 1, wherein the pressing member and the dielectric substrate are in contact with each other in the center surface portion of the first radiating element and offset from the feed point.

17. A communication device, comprising:

a dielectric substrate;

multiple radiating elements that have a flat shape and that are arranged co-linearly on the dielectric substrate;

a cover member that covers the dielectric substrate; and a pressing member disposed in contact with the cover member and the dielectric substrate and protruding from an inner surface of the cover member toward at least part of the multiple radiating elements, wherein each of the multiple radiating elements includes a feed point to which a radio frequency signal from a feed circuit is supplied, and the pressing member is in contact with each opposing radiating element of the at least part of the radiating elements of the corresponding radiating elements in a center surface portion relative to the feed point in a plan view from a normal direction of the dielectric substrate.

18. The communication device according to claim 17, wherein the at least part of the radiating elements includes two or more radiating elements.

19. The communication device according to claim 17, wherein the pressing member is disposed so as to oppose at least each radiating element disposed at opposite ends of the multiple radiating elements.

20. The communication device according to claim 17, wherein the multiple radiating elements include three or more radiating elements, and the pressing member is in contact with the center surface portion of the three or more radiating elements.

* * * * *